(12) United States Patent
Kashiwakura et al.

(10) Patent No.: US 12,014,313 B2
(45) Date of Patent: Jun. 18, 2024

(54) INFORMATION PROCESSING DEVICE, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Toshiki Kashiwakura, Tokyo-to (JP); Yukiya Sugiyama, Toyota (JP); Kano Asai, Okazaki (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/455,078

(22) Filed: Nov. 16, 2021

(65) Prior Publication Data
US 2022/0164759 A1    May 26, 2022

(30) Foreign Application Priority Data

Nov. 20, 2020    (JP) ................. 2020-193445

(51) Int. Cl.
*G06Q 10/083*    (2024.01)
*G06Q 10/087*    (2023.01)
*G06V 20/00*    (2022.01)
*G06V 40/16*    (2022.01)

(52) U.S. Cl.
CPC ......... *G06Q 10/083* (2013.01); *G06Q 10/087* (2013.01); *G06V 20/00* (2022.01); *G06V 40/172* (2022.01)

(58) Field of Classification Search
CPC .................................................. G06Q 10/083

USPC ......................................................... 705/330
See application file for complete search history.

(56) References Cited

U.S. PATENT DOCUMENTS

| | | | |
|---|---|---|---|
| 9,659,310 B1 * | 5/2017 | Allen ................. | G06Q 30/0254 |
| 2002/0178066 A1 * | 11/2002 | Roh ..................... | G06Q 20/203 |
| | | | 705/22 |
| 2008/0071602 A1 * | 3/2008 | Ojakaar ............. | G06Q 30/0603 |
| | | | 705/306 |

(Continued)

FOREIGN PATENT DOCUMENTS

| | | |
|---|---|---|
| JP | H10-316210 A | 12/1998 |
| JP | 2001-357462 A | 12/2001 |

(Continued)

OTHER PUBLICATIONS

Abhishek Das et al. "Smart Refrigerator using Internet of Things and Android." Dec. 18, 2020. https://arxiv.org/abs/2012.10422. pp. 1-5. (Year: 2020).*

*Primary Examiner* — Jeff Zimmerman
*Assistant Examiner* — Hunter A Molnar
(74) *Attorney, Agent, or Firm* — Sughrue Mion, PLLC

(57) ABSTRACT

An information processing device includes a processor that: acquires history information indicating a history, about a first product, of storage in a repository or removal from the repository, the storage or the removal being detected by a sensor provided at the repository; acquires first information indicating a consumption pattern, for the first product, of a user associated with the repository, the first information being acquired based on the history information; and performs a process related to delivery of the first product to the user based on the first information.

13 Claims, 12 Drawing Sheets

(56) References Cited

U.S. PATENT DOCUMENTS

| | | |
|---|---|---|
| 2018/0260867 A1* | 9/2018 | Lin ................... G06Q 20/405 |
| 2019/0164218 A1 | 5/2019 | Miyajima |
| 2019/0295148 A1* | 9/2019 | Lefkow ............. G06Q 10/0833 |
| 2020/0088463 A1* | 3/2020 | Jeong .................... G06F 3/011 |
| 2020/0184434 A1* | 6/2020 | Evans ................. G06Q 20/102 |
| 2020/0202379 A1* | 6/2020 | Yacoub ............. G06Q 30/0222 |
| 2021/0049670 A1* | 2/2021 | Alvo ..................... G06Q 10/04 |
| 2021/0192599 A1 | 6/2021 | Miyajima |
| 2022/0067642 A1* | 3/2022 | Barton .................. G01G 19/52 |

FOREIGN PATENT DOCUMENTS

| | | |
|---|---|---|
| JP | 2002-074142 A | 3/2002 |
| JP | 2010-250753 A | 11/2010 |
| JP | 2013-250697 A | 12/2013 |
| JP | 7307491 B2 * | 7/2023 |
| WO | 2018/012073 A1 | 1/2018 |

\* cited by examiner

*FIG. 4*

STORAGE/REMOVAL HISTORY INFORMATION DATABASE

| TIMESTAMP | SENSOR ID | PRODUCT ID | INDIVIDUAL ID |
|---|---|---|---|
| YYYY:MM:DD:HH:MM:SS | S001 | T001 | X001 |
| | | | |
| | | | |

FIG. 5

STOCK INFORMATION TABLE

| PRODUCT ID | INDIVIDUAL ID | STATE | UPDATE DATE/TIME |
|---|---|---|---|
| T001 | X001 | STORAGE | YYYY:MM:DD:HH:MM:SS |
| | | | |
| | | | |
| | | | |

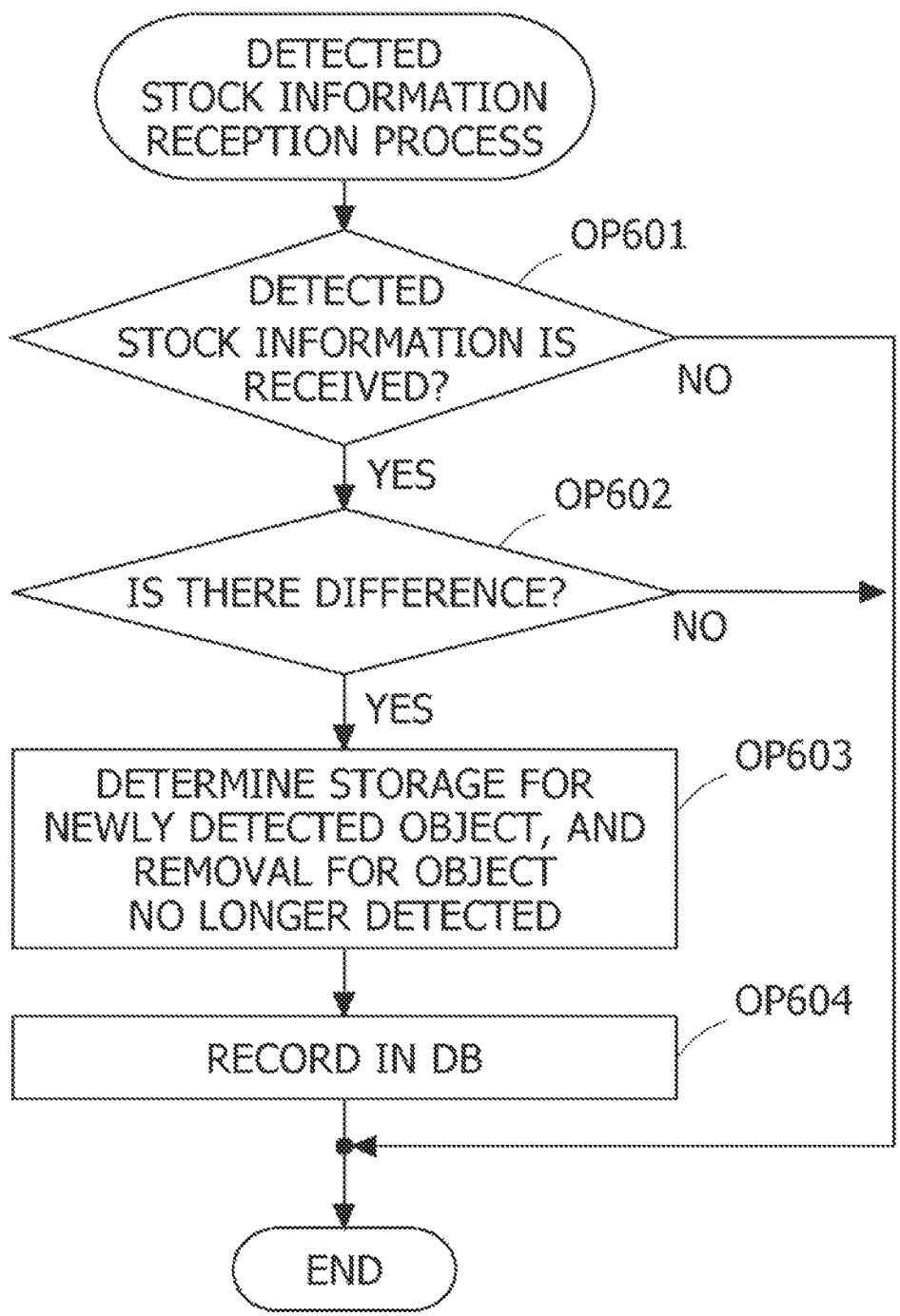

INFORMATION PROCESSING DEVICE, INFORMATION PROCESSING SYSTEM, AND INFORMATION PROCESSING METHOD

CROSS REFERENCE TO THE RELATED APPLICATION

This application claims the benefit of Japanese Patent Application No. 2020-193445, filed on Nov. 20, 2020, which is hereby incorporated by reference herein in its entirety.

BACKGROUND

Technical Field

The present disclosure relates to an information processing device, an information processing system, and an information processing method.

Description of the Related Art

There is disclosed a product recommendation system that specifies a person with similar taste as a client based on a purchase history of discretionary foods and evaluation thereof, refers to a discretionary food purchase history of the specified person, and encourages the client to make a purchase in relation to a discretionary food (for example, Patent Document 1).
[Patent Document 1] Japanese Patent Laid-Open No. 2002-074142

An aspect of the disclosure is aimed at providing an information processing device, an information processing system, and an information processing method that are capable of efficiently collecting information indicating a consumption pattern for a product.

SUMMARY

An aspect of the present disclosure is an information processing device comprising a processor that:
acquires history information indicating a history, about a first product, of storage in a repository or removal from the repository, the storage or the removal being detected by a sensor provided at the repository;
acquires first information indicating a consumption pattern, for the first product, of a user associated with the repository, the first information being acquired based on the history information; and performs a process related to delivery of the first product to the user based on the first information.

Another aspect of the present disclosure is an information processing system comprising:
a repository including a sensor that detects storage or removal of a first product; and
a processor that:
acquires history information indicating a history, about the first product, of storage in the repository or removal from the repository, the storage or the removal being detected by the sensor,
acquires first information indicating a consumption pattern, for the first product, of a user associated with the repository, the first information being acquired based on the history information, and
performs a process related to delivery of the first product to the user based on the first information.

Another aspect of the present disclosure is an information processing method performed by a computer, the method comprising:
acquiring history information indicating a history, about a first product, of storage in a repository or removal from the repository, the storage or the removal being detected by a sensor provided at the repository;
acquiring first information indicating a consumption pattern, for the first product, of a user associated with the repository, the first information being acquired based on the history information; and
performing a process related to delivery of the first product to the user based on the first information.

According to an aspect of the present disclosure, information indicating a consumption pattern for a product may be efficiently collected.

BRIEF DESCRIPTION OF THE DRAWINGS

FIG. 4 is a diagram illustrating an example of information that is held in the storage/removal history information database;

FIG. 5 is a diagram illustrating an example of information that is held in the stock information database;

FIG. 11 is an example of a flowchart of a process, according to the third embodiment, that is performed by the center server at the time of reception of the detected stock information.

DESCRIPTION OF THE EMBODIMENTS

Figure 1:
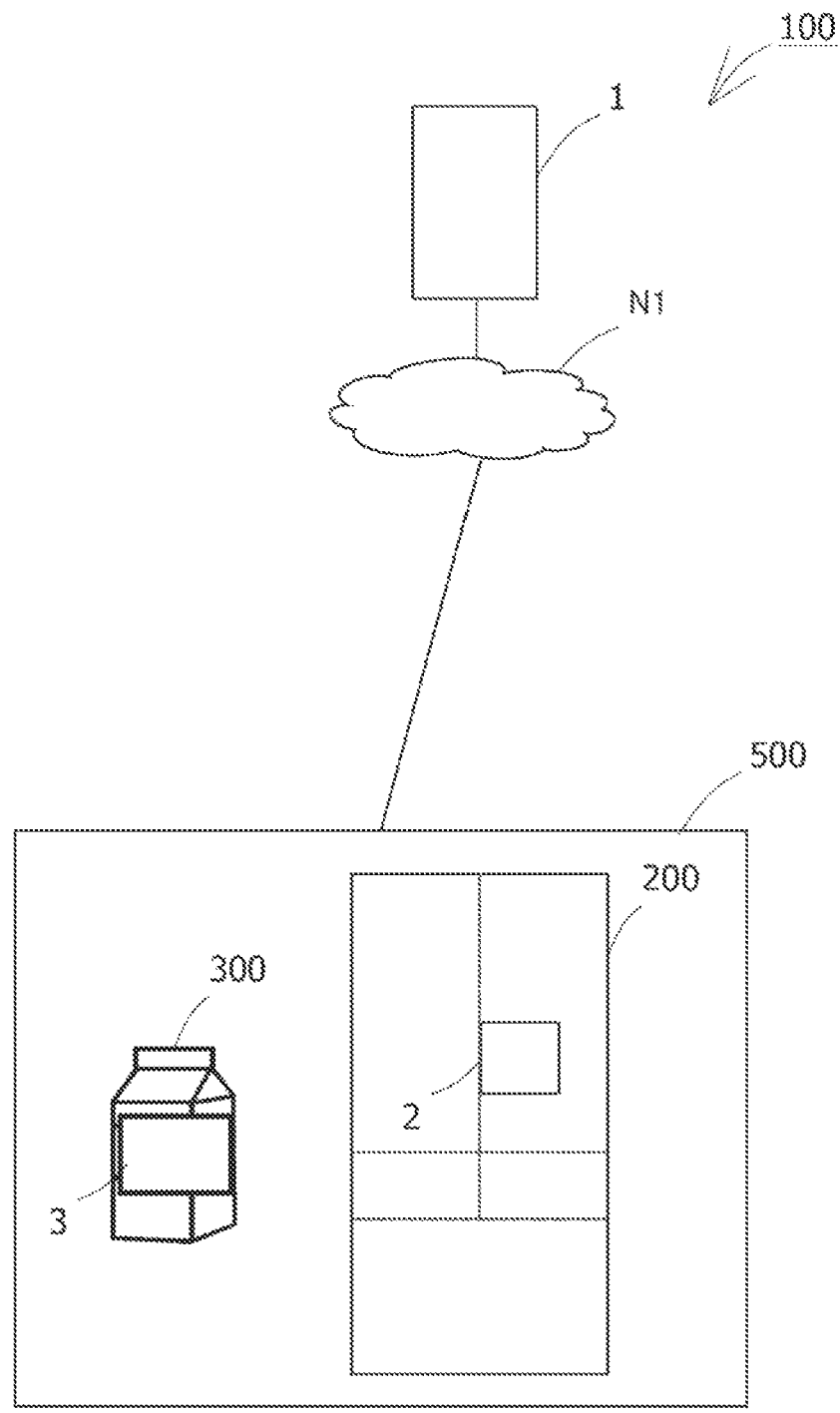
FIG. 1 is a diagram illustrating an example configuration of a storage/removal management system according to a first embodiment.

An aspect of the present disclosure is an information processing device including a processor. The processor may acquire history information indicating a history, about a first product, of storage in a repository or removal from the repository, the storage or the removal being detected by a sensor provided at the repository. The processor may acquire first information indicating a consumption pattern, for the first product, of a user associated with the repository, the first information being acquired based on the history information. The processor may perform a process related to delivery of the first product to the user based on the first information.

For example, the information processing device is a server. For example, the processor is a central processing unit (CPU). For example, the repository is a refrigerator, a freezer, a wine cellar, a predetermined storage shelf, or the like. The first product is a product to be stored in such a repository. For example, in the case where the repository is a refrigerator, the first product is a beverage such as canned beer, milk or juice, or a food. For example, in the case where the repository is a wine cellar, the first product is wine. Additionally, the first product is not limited to food and beverage, and may include daily necessities such as detergents and shampoos.

For example, the sensor that is provided at the repository is a reader for RF tags, a reader for codes such as barcodes or QR codes (registered trademark), or a camera. When a product is stored in or removed from the repository, the sensor provided at the repository detects storage or removal of the product by reading a barcode or a QR code printed on or attached to the product. Alternatively, the history information indicating storage or removal is acquired by the sensor provided at the repository monitoring a change in products stored in the repository, by reading electronic tags such as RF tags attached to or embedded in the products stored in the repository.

Additionally, a plurality of types of sensors may be used as the sensor to be provided at the repository for detection of storage and removal of a product. For example, if an RF tag, or a barcode or a QR code printed on or attached to a product includes identification information on the product but not identification information on an individual piece, the individual piece is not identified. Accordingly, in addition to the reader for RF tags, barcodes or QR codes, a sensor that is capable of detecting a change in the number of pieces in the repository due to storage and removal may also be used. For example, the sensor that is capable of detecting a change in the number of pieces in the repository due to storage and removal may be a weight sensor, a sensor that detects opening/closing of the door of the repository, or a camera that captures the inside of the repository.

For example, in the case where the reader and a weight sensor are used, when a product is detected by the reader, if a detected value of the weight sensor is increased, storage of the product is detected, and if the detected value of the weight sensor is decreased, removal of the product is detected. For example, in the case where the reader and an open/close sensor for the door of the repository are used, storage of a product is detected when a product is detected by the reader and then opening of the door of the repository is detected by the open/close sensor. In contrast, when opening of the door of the repository is detected by the open/close sensor and then a product is detected by the reader, removal of the product is detected, for example. In the case where the reader and a camera are used, for example, when a product is detected by the reader, if an increase in the number of pieces in the repository is detected from a captured image from the camera, storage of the product is detected, and if a decrease in the number of pieces in the repository is detected from the captured image from the camera, removal of the product is detected.

Consumption of the first product accompanies an action of removing the first product from the repository, and thus, by analyzing the history information about storage or removal of the first product, information indicating a consumption pattern for the first product may be acquired. That is, according to an aspect of the present disclosure, because storage and removal of the first product is detected by the sensor provided at the repository, and the history information about storage or removal of the first product is collected, information indicating the consumption pattern for the product stored in the repository may be efficiently collected. The term "efficiently" here means that the user does not have to perform an action other than regular actions of opening/closing the door and moving the first product, for example, at the time of collection of the history information about storage or removal of the first product.

According to an aspect of the present disclosure, in a case where subscription to the first product is set, and the first information indicates that consumption frequency of the first product is lower than a first threshold, the processor may propose to the user, as control related to delivery, that the user stop the subscription to the first product. This allows the user to avoid unnecessary purchase of the first product with lower consumption frequency due to delivery of subscription, for example. Furthermore, in this case, the information processing device may further include a storage that stores the first threshold for each product. The processor may further acquire the first threshold for the first product from the storage. The consumption frequency is different for each product, but a proposal to stop subscription may be flexibly made depending on property and consumption frequency of the product.

Furthermore, according to an aspect of the present disclosure, in a case where subscription to the first product is set, and the first information indicates that an amount of change in consumption frequency of the first product is a predetermined amount or more, the processor may propose to the user, as control related to delivery, that the user change setting of at least one of a delivery interval and an order quantity per delivery in relation to the subscription to the first product. This allows the user to adjust, according to the consumption frequency of the first product, the delivery interval or the order quantity per delivery in relation to the subscription.

Furthermore, according to an aspect of the present disclosure, in a case where subscription to the first product is not set, and the first information indicates that consumption frequency of the first product is at or higher than a second threshold, the processor may propose to the user, as control related to delivery, that the user subscribe to the first product. For example, in the case where the user applies for subscription to the first product, the user may be supported in relation to stock management of the first product.

Furthermore, according to an aspect of the present disclosure, the processor may further transmit, to the user, a recommendation for another product of a type into which the first product is categorized, in a case where the first information indicates that consumption frequency of the first product or a product of the type into which the first product is categorized is at or higher than a third threshold. Because the consumption frequency of the first product is at or higher than the third threshold, the user is expected to have a certain level of interest in another product of the type into which the first product is categorized, and there is a promising outlook for sales for such other product.

Furthermore, according to an aspect of the present disclosure, the processor may further present, to the user, a questionnaire for evaluation of the first product, in a case where consumption of the first product is detected based on the history information. Information about taste of the user may thus be more accurately collected. Moreover, the processor may further receive an answer result to the questionnaire, and may perform the process related to delivery of the first product based further on the answer result to the questionnaire. The delivery of the first product may thus be controlled in better accordance with a real state of the user, based on a fact of consumption of the first product by the user and taste information on the user based on the answer to the questionnaire.

Furthermore, according to an aspect of the present disclosure, a second sensor that detects a user storing or removing the first product may be provided at the repository. The information processing device may further include a second storage that stores an association between the repository and identification information on a plurality of users. The processor may acquire, together with the history information, the identification information on a user identified by the second sensor, and may acquire the first information for each of the plurality of users. Control of delivery of the first product, presentation of the questionnaire, and the like may thus be performed according to the consumption pattern, for the first product, of each user associated with the repository.

Furthermore, according to an aspect of the present disclosure, the processor may further instruct a robot to deliver the first product and to output a proposal to the user in the process related to delivery of the first product. A proposal to the user about delivery of the first product may thus be output at a timing of delivery of the first product to the user by the robot. The robot may be further caused to output a recommendation for another product, and the questionnaire.

Another aspect of the present disclosure may be specified as an information processing system including a repository including a sensor that detects storage or removal of a first product, and the processor described above. The processor is configured to acquire history information indicating a history, about the first product, of storage in the repository or removal from the repository, the storage or the removal being detected by the sensor, acquire first information indicating a consumption pattern, for the first product, of a user associated with the repository, the first information being acquired based on the history information, and perform a process related to delivery of the first product to the user based on the first information.

Moreover, another aspect of the present disclosure may be specified as an information processing method that is performed by a computer. The information processing method includes acquiring history information indicating a history, about a first product, of storage in a repository or removal from the repository, the storage or the removal being detected by a sensor provided at the repository; acquiring first information indicating a consumption pattern, for the first product, of a user associated with the repository, the first information being acquired based on the history information; and performing a process related to delivery of the first product to the user based on the first information.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example configuration of a storage/removal management system 100 according to a first embodiment. The storage/removal management system 100 is a system for monitoring storage and removal of products stored in a repository, and for providing services according to consumption patterns for the products. For example, the storage/removal management system 100 includes a center server 1, and a refrigerator 200 including a sensor device 2. Additionally, the refrigerator 200 is installed at home 500 of a user. A plurality of refrigerators 200 may be included in the storage/removal management system 100, but FIG. 1 illustrates one for the sake of convenience. The refrigerator 200 is an example of "repository". However, "repository" is not limited to a refrigerator, and may alternatively be a freezer, a wine cellar, a storage shelf or the like, for example.

In the first embodiment, the sensor device 2 is a control device including a reader for codes such as barcodes or QR codes. The sensor device 2 may be integrated and sold together with the refrigerator 200, or may be singly sold to be attached to the refrigerator 200 later. The sensor device 2 connects to a network N1 by wirelessly connecting to a relay device installed in the home 500, for example. The center server 1 is also connected to the network N1. The network N1 is a public network such as the Internet, for example. The sensor device 2 is capable of communicating with the center server 1 over the network N1.

For example, a code 3 is printed on or attached to an object 300 to be stored in the refrigerator 200. In the first embodiment, the object 300 is a beverage, a food, a seasoning or the like. However, in the case where the repository is a storage shelf or the like, the object 300 may be a daily necessity, a detergent or the like. For example, a user places the code 3 on the object 300 over (or in contact with) the reader at the time of storing the object 300 in the refrigerator 200 or removing the object 300 from the refrigerator 200, and the reader of the sensor device 2 reads the code 3 and acquires identification information on the object 300. The identification information on the object 300 includes identification information on a product corresponding to the object 300, and an individual identification number, for example. The sensor device 2 transmits, to the center server 1, storage/removal history information including the identification information on the object 300 that is acquired. Additionally, in the first embodiment, the term "object" refers to an individual piece. Furthermore, the term "product" refers to a group of individual pieces with a same product name or with a same size.

The center server 1 receives the storage/removal history information on the object 300 from the sensor device 2, and records the same. The center server 1 aggregates the storage/removal history information over a predetermined period of time. In the first embodiment, an aggregate result of the storage/removal history information indicates the number of times of storage/removal and frequency of storage/removal for each product corresponding to the object 300 and for each type into which the product corresponding to the object 300 is categorized. For example, the center server 1 provides a service based on the frequency of storage/removal. The services provided based on the frequency of storage/removal include a process related to delivery of a product, recommendation of a product, and the like, for example. The process related to delivery of a product is a proposal to stop subscription, a proposal to change setting related to subscription, a proposal to start subscription, or the like, for example. In addition to these services, the center server 1 may request a questionnaire to be answered, for example.

The number of times of storage/removal and the frequency of storage/removal for each product and for each type of product are each an information piece indicating the consumption pattern for the product. For example, the greater the number of times of storage/removal or the higher the frequency of storage/removal, the higher the consumption frequency of the product. For example, the smaller the number of times of storage/removal or the lower the frequency of storage/removal, the lower the consumption frequency of the product. That is, the number of times of storage/removal and the frequency of storage/removal can be said to be information pieces reflecting an actual state of consumption of a product by the user.

In the first embodiment, the center server 1 may, efficiently and without troubling the user, collect the storage/removal history information on an object that is stored in the refrigerator 200, and acquire consumption pattern information indicating the consumption pattern of the user for the product based on the collected storage/removal history information. Furthermore, the center server 1 may provide a more helpful service according to the actual state of consumption by the user, by providing a service based on the consumption pattern information on the user.

Figure 2:
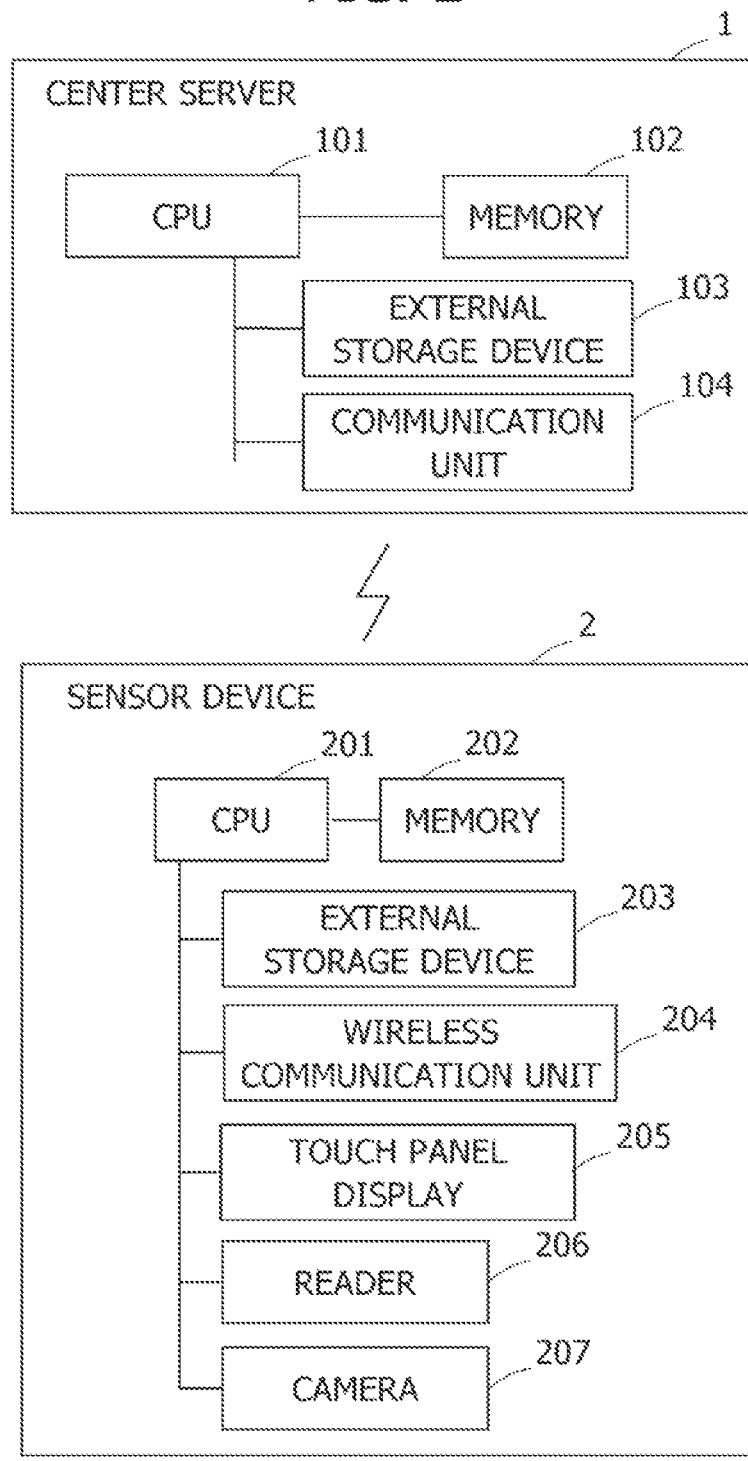
FIG. 2 is a diagram illustrating an example of a hardware configuration of the center server and the sensor device according to the first embodiment.

FIG. 2 is a diagram illustrating an example of a hardware configuration of the center server 1 and the sensor device 2 according to the first embodiment. As hardware components, the center server 1 includes a central processing unit (CPU) 101, a memory 102, an external storage device 103, and a communication unit 104. The memory 102 and the external storage device 103 are each a computer-readable recording medium. The center server 1 is an example of "information processing device".

The external storage device 103 stores various programs, and data to be used by the CPU 101 at the time of execution of each program. For example, the external storage device 103 is an erasable programmable ROM (EPROM) and/or a hard disk drive. Programs to be held in the external storage device 103 include an operating system (OS), a control program of the storage/removal management system 100, and various other application programs, for example. The control program of the storage/removal management system 100 is a program for collecting history information about storage in the refrigerator 200 or removal from the refrigerator 200, acquiring the consumption pattern of the user based on the history information, and providing a service based on the consumption pattern of the user.

The memory 102 is a main memory that provides the CPU 101 with a work area and a storage area where programs stored in the external storage device 103 are loaded, and that is used as a buffer, for example. The memory 102 includes semiconductor memories such as a read only memory (ROM) and a random access memory (RAM), for example.

The CPU 101 performs various processes by loading the OS and various application programs held in the external storage device 103 into the memory 102 and executing the same. The number of CPUs 101 is not limited to one and may be more than one. The CPU 101 is an example of "processor".

The communication unit 104 is an interface through which information is input/output to the network. For example, the communication unit 104 is a local area network (LAN) card, or the like. However, the communication unit 104 is not limited thereto, and may alternatively be an optical network unit (ONU) interface for an optical communication network, for example. The hardware configuration of the center server 1 is not limited to the one illustrated in FIG. 2.

As hardware components, the sensor device 2 includes a CPU 201, a memory 202, an external storage device 203, a wireless communication unit 204, a touch panel display 205, a reader 206, and a camera 207. The CPU 201, the memory 202, and the external storage device 203 are the same as the CPU 101, the memory 102, and the external storage device 103, respectively.

The wireless communication unit 204 is an interface through which information is input/output to the network. For example, the wireless communication unit 204 accesses the network N1 and communicates with the center server 1 by performing wireless communication through WiFi, Bluetooth (registered trademark) Low Energy (BLE) or the like and connecting to a relay device such as an access point installed at the home 500 of the user.

The touch panel display 205 receives an operation input from the user, and outputs the same to the CPU 201. Furthermore, the touch panel display 205 displays an image that is input from the CPU 201.

In the first embodiment, the reader 206 is a reader for QR codes or barcodes. For example, the reader 206 radiates red light on the code 3, images and decodes reflected light, and acquires information.

The camera 207 is used to capture a facial image of the user, for example. Furthermore, the camera 207 may be used as the reader for the code 3 on the object 300. An image captured by the camera 207 is output to the CPU 201.

Additionally, the hardware configurations of the center server 1 and the sensor device 2 illustrated in FIG. 2 are merely examples and are not restrictive. For example, the refrigerator 200 may further include a sensor that is capable of recognizing storage or removal of the object 300. The sensor that is capable of recognizing storage or removal of the object 300 is a weight sensor, a camera or the like, for example. In the case where a detected value of the weight sensor is increased, storage of the object 300 may be detected. In the case where the detected value of the weight sensor is decreased, removal of the object 300 may be detected. In the case where the camera captures an inside of the refrigerator 200, storage of the object 300 may be detected when the object 300 is newly detected from the captured image. When the object 300 is not detected from the captured image, removal of the object 300 may be detected.

Figure 3:
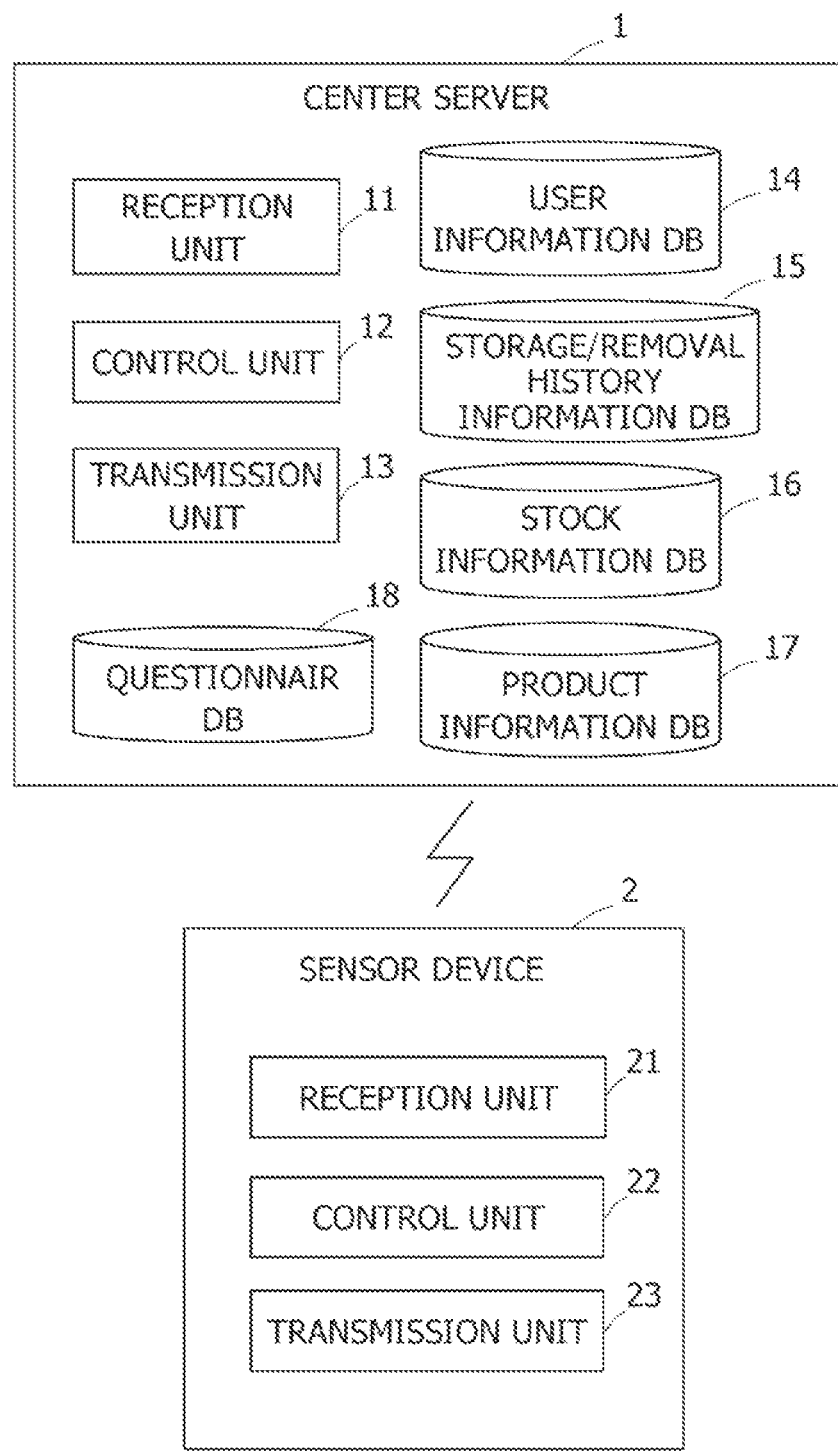
FIG. 3 is a diagram illustrating an example of a functional configuration of the center server and the sensor device according to the first embodiment.

FIG. 3 is a diagram illustrating an example of a functional configuration of the center server 1 and the sensor device 2 according to the first embodiment. First, as functional components, the sensor device 2 includes a reception unit 21, a control unit 22, and a transmission unit 23. These functional components are implemented by the CPU 201 of the sensor device 2 executing predetermined programs in the external storage device 203.

The reception unit 21 and the transmission unit 23 are interfaces to the center server 1. The transmission unit 23 transmits data input from the control unit 22 to the center server 1 through wireless communication unit 204. The reception unit 21 receives data from the center server 1 through the wireless communication unit 204, and outputs the received data to the control unit 22.

In the first embodiment, the control unit 22 receives, from the reader 206, input of identification information on the object 300 read from the code 3. In the case where the object 300 is stored in or removed from the refrigerator 200, the reader 206 acquires the identification information on the object 300, and outputs the same to the control unit 22. When input of the identification information on the object 300 is received, the control unit 22 creates the storage/removal history information, outputs the information to the transmission unit 23, and transmits the information to the center server 1 through the transmission unit 23. The storage/removal history information includes a timestamp, identification information on the sensor device 2, and the identification information on the object 300, for example. The timestamp included in the storage/removal history information indicates a time of detection of the identification information on the object 300, for example.

Additionally, in the case where the refrigerator 200 includes, in addition to the reader 206, a sensor that is capable of recognizing storage or removal of the object 300, a detection result from the sensor is also input to the control unit 22. For example, in the case where the weight sensor is provided as the sensor that is capable of recognizing storage or removal of the object 300, the control unit 22 determines storage of the object 300 in a case where a detected value of the weight sensor is increased. The control unit 22 determines removal of the object 300 in a case where the detected value of the weight sensor is decreased. For example, in the case where the camera that captures the inside of the refrigerator 200 is provided as the sensor that is capable of recognizing storage or removal of the object 300, the control unit 22 determines storage of the object 300 when the object 300 is newly detected from a captured image as a detected value. Furthermore, the control unit 22 determines removal of the object 300 when the object 300 is no longer detected from the captured image.

In the case where the refrigerator 200 includes, in addition to the reader 206, the sensor that is capable of recognizing storage or removal of the object 300, the control unit 22 may create the storage/removal history information including, in addition to the timestamp, the identification information on the sensor device 2 and the identification information on the object 300, information indicating storage or removal of the object 300.

The control unit 22 outputs, to the touch panel display 205, a proposal, a notification, a questionnaire or the like received from the center server 1 through the reception unit 21, and also, transmits information input through the touch panel display 205, for example, to the center server 1 through the transmission unit 23. Information that is input through the touch panel display 205 may be an answer to a questionnaire, for example.

Next, the center server 1 includes, as functional components, a reception unit 11, a control unit 12, a transmission unit 13, a user information database (DB) 14, a storage/removal history information DB 15, a stock information DB 16, a product information DB 17, and a questionnaire DB 18. These functional components are implemented by the CPU 101 executing the control program of the storage/removal management system 100.

The reception unit 11 receives the storage/removal history information from the sensor device 2 over the network N1. The reception unit 11 outputs the received information to the control unit 12. The transmission unit 13 transmits information input from the control unit 12 to the sensor device 2 over the network N1.

When the storage/removal history information is received from the sensor device 2, the control unit 12 stores the same in the storage/removal history information DB 15. Furthermore, when the storage/removal history information is received from the sensor device 2, the control unit 12 determines whether the storage/removal history information is for storage or for removal, by referring to the storage/removal history information DB 15, for example, and stores the determination result in the stock information DB 16.

The control unit 12 aggregates, at a predetermined timing, the storage/removal history information on a predetermined period of time, and acquires the consumption pattern information indicating the consumption pattern of the user. For example, the consumption pattern information is the number of times of storage/removal and the frequency of storage/removal for each product and for each type of product in the predetermined period of time. In the first embodiment, the number of times of storage/removal is calculated based on the number of storage/removal history information pieces. A large number of times of storage/removal indicates that use frequency of the product is high, and that the use frequency of the product is high indicates that the consumption frequency of the product is high. The timing of acquisition of the consumption pattern information is arbitrarily set to once per day, week, month or the like. The period of time over which the storage/removal history information is aggregated is arbitrarily set in units of one day, one week, one month or the like. Additionally, an interval of acquisition of the consumption pattern information pieces and the period of time when the storage/removal history information pieces are acquired may be same or different.

Additionally, in the first embodiment, the number of storage/removal history information pieces is counted, and the number of times of storage/removal is used as the consumption pattern information, but information to be used as the consumption pattern information is not limited thereto. For example, consumption of the object 300 may be determined based on the storage/removal history information, history information about consumption may be held, and the consumption frequency may be acquired as the consumption pattern information based on the history information about consumption. For example, storage or removal is recognized based on the storage/removal history information, and consumption of the object 300 may be determined when the next storage/removal history information about the object 300 is not received after a lapse of a predetermined period of time from the timestamp included in the storage/removal history information based on which the removal is recognized.

As services based on the consumption pattern information, the control unit 12 transmits, to the user, a proposal to start subscription, to change setting or to stop subscription, a notification for recommending a product, and a questionnaire. Details of such processes by the control unit 12 will be given later.

The user information DB 14, the storage/removal history information DB 15, the stock information DB 16, the product information DB 17, and the questionnaire DB 18 are created in the external storage device 103 of the center server 1. The user information DB 14 holds user information that is information about the user. For example, the user information includes identification information on the user, name of the user, address of the user, the identification information on the sensor device 2 used by the user, and information about subscription. The user information held in the user information DB 14 is registered at the time of user registration, for example. The information about subscription includes identification information on a product for which subscription is set, a delivery interval, an order quantity per delivery, and the like.

The storage/removal history information DB 15 holds the storage/removal history information that is received from the sensor device 2. The stock information DB 16 holds information about the object 300 that is stored in the refrigerator 200. Details of information pieces held in the storage/removal history information DB 15 and the stock information DB 16 will be given later. The product information DB 17 holds product information that is information about a product. For example, the product information stores identification information on a product, various thresholds used to determine whether to make proposals, regarding the product, to start subscription, change setting and stop subscription, and the like. The questionnaire DB 18 stores an answer of the user to a questionnaire. Additionally, the functional configurations of the center server 1 and the sensor device 2 are not limited to those illustrated in FIG. 3.

FIG. 4 is a diagram illustrating an example of information that is held in the storage/removal history information DB 15. One record in the storage/removal history information DB 15 includes the following fields: timestamp, sensor ID, product ID, and individual ID. The identification information on the sensor device 2 is stored in the field "sensor ID". The identification information on the product corresponding to the object 300 is stored in the field "product ID". Individual identification information on the object 300 is stored in the field "individual ID".

One record in the storage/removal history information DB 15 corresponds to one storage/removal history information piece that is received from the sensor device 2. That is, values to be stored in the fields "timestamp", "sensor ID", "product ID", and "individual ID" are acquired based on the timestamp, the identification information on the sensor device 2, and the identification information on the object 300 that are included in the storage/removal history information that is received from the sensor device 2. Additionally, in the first embodiment, the identification information on the object 300 that is included in the storage/removal history information received from the sensor device 2 includes the identification information on the product and the individual identification information on the object 300.

Additionally, information pieces that are stored in the storage/removal history information DB 15 are not limited to those illustrated in FIG. 4. For example, in the case where the identification information on the object 300 that is acquired from a QR code or a barcode on the object 300 includes the identification information on the product but not the individual identification information on the object 300, the field "individual ID" is not included in the record in the storage/removal history information DB 15.

FIG. 5 is a diagram illustrating an example of information that is held in the stock information DB 16. The stock information DB 16 holds a stock information table. The stock information table is created for each sensor device 2. The stock information table is a table for managing a state of storage or removal of the object 300 stored in the refrigerator 200 corresponding to the sensor device 2.

One record in the stock information DB 16 includes the following fields: product ID, individual ID, state, and update date/time. The identification information on the product corresponding to the object 300 is stored in the field "product ID". The individual identification information on the object 300 is stored in the field "individual ID".

Information indicating storage, removal, or consumption of the object 300 is stored in the field "state". The information indicating storage, removal, or consumption of the object 300 is a flag or a code, for example. A time of detection of the value in the field "state" is stored in the field "update date/time".

For example, the control unit 12 receives the storage/removal history information from the sensor device 2, determines storage or removal of the object 300 by referring to the storage/removal history information DB 15, and records the determination result in the stock information DB 16. Accordingly, values in the fields "product ID" and "individual ID" are acquired from the storage/removal history information at the time of first reception of the storage/removal history information on the corresponding object 300. The determination result indicating storage or removal, at the time of last reception of the storage/removal history information on the object 300, is stored in the field "state". The timestamp included in the storage/removal history information on the object 300 that is last received is stored in the field "update date/time". Additionally, information pieces that are stored in the stock information DB 16 are not limited to those illustrated in FIG. 5.

For example, in the case where the identification information on the object 300 that is acquired from the QR code or the barcode on the object 300 includes the identification information on the product but not the individual identification information on the object 300, the field "individual ID" is not included in the record in the stock information DB 15.

<Flow of Processes>

Figure 6:
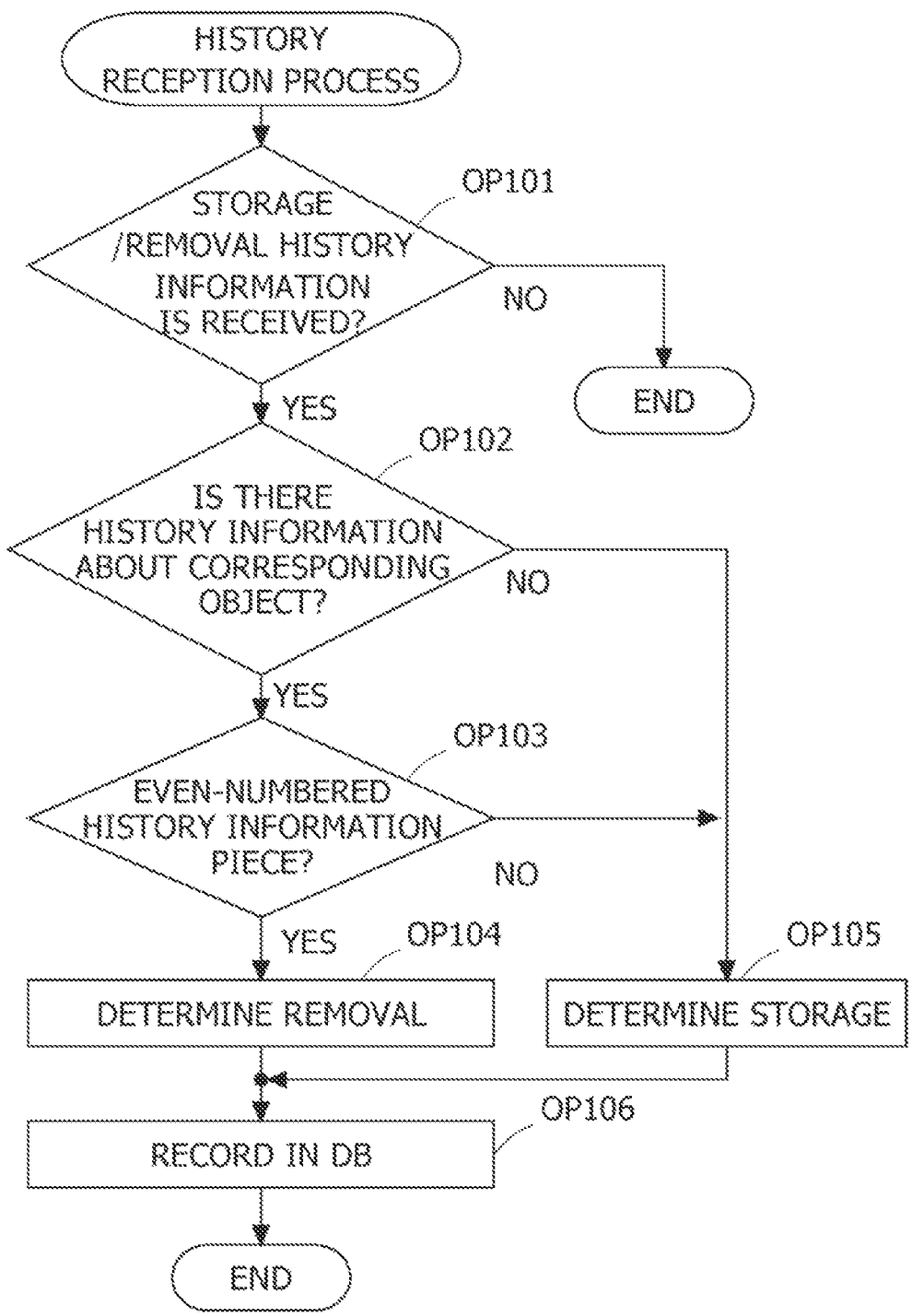
FIG. 6 is an example of a flowchart of a process performed by the center server at the time of reception of the storage/removal history information.

FIG. 6 is an example of a flowchart of a process performed by the center server 1 at the time of reception of the storage/removal history information. The process illustrated in FIG. 6 is repeated every predetermined period. The performer of the process illustrated in FIG. 6 is the CPU 101, but a functional component will be described to be the performer for the sake of convenience. The same applies to subsequent flowcharts.

In OP101, the control unit 12 determines whether the storage/removal history information is received from the sensor device 2 through the reception unit 11. In the case where the storage/removal history information is received from the sensor device 2 (OP101: YES), the process proceeds to OP102. In the case where the storage/removal history information is not received from the sensor device 2 (OP101: NO), the process illustrated in FIG. 6 is ended.

In OP102, the control unit 12 determines whether storage/removal history information matching the identification information on the object 300 included in the received storage/removal history information is included in the storage/removal history information DB 15. In the case where storage/removal history information matching the identification information on the object 300 included in the received storage/removal history information is included in the storage/removal history information DB 15 (OP102: YES), the process proceeds to OP103. In the case where storage/removal history information matching the identification information on the object 300 included in the received storage/removal history information is not included in the storage/removal history information DB 15 (OP102: NO), the process proceeds to OP105, and in OP105, the control unit 12 determines that the received storage/removal history information indicates storage of the object 300.

In OP103, the control unit 12 determines whether the received storage/removal history information is an even-numbered storage/removal history information piece of the object 300. In the case where identification information enabling identification of the object 300 as an individual piece is acquired from the code 3 on the object 300, whether the object 300 is stored or removed may be recognized based on the number of storage/removal history information pieces. This is because, at the time of storage and removal of the object 300 from the refrigerator 200, storage is performed first, and removal is performed after storage. Accordingly, storage/removal history information that is created at the time of storage is an odd-numbered storage/removal history information piece for the object 300. In contrast, storage/removal history information that is created at the time of removal is an even-numbered storage/removal history information piece for the object 300.

In the case where the received storage/removal history information is an even-numbered storage/removal history information piece for the object 300 (OP103: YES), the process proceeds to OP104, and in OP104, the control unit 12 determines that the received storage/removal history information indicates removal of the object 300. In the case where the received storage/removal history information is an odd-numbered storage/removal history information piece for the object 300 (OP103: NO), the process proceeds to OP105, and in OP105, the control unit 12 determines that the received storage/removal history information indicates storage of the object 300.

In OP106, the control unit 12 records the received storage/removal history information in the storage/removal history information DB 15, and the determination result of OP103 in the stock information DB 16. The process illustrated in FIG. 6 is then ended.

Additionally, in the case where the refrigerator 200 includes, in addition to the reader 206, a sensor that is capable of recognizing storage or removal of the object 300, and information indicating storage or removal is stored in the storage/removal history information received from the sensor device 2, the processes in OP102 to OP105 are omitted.

Figure 7:
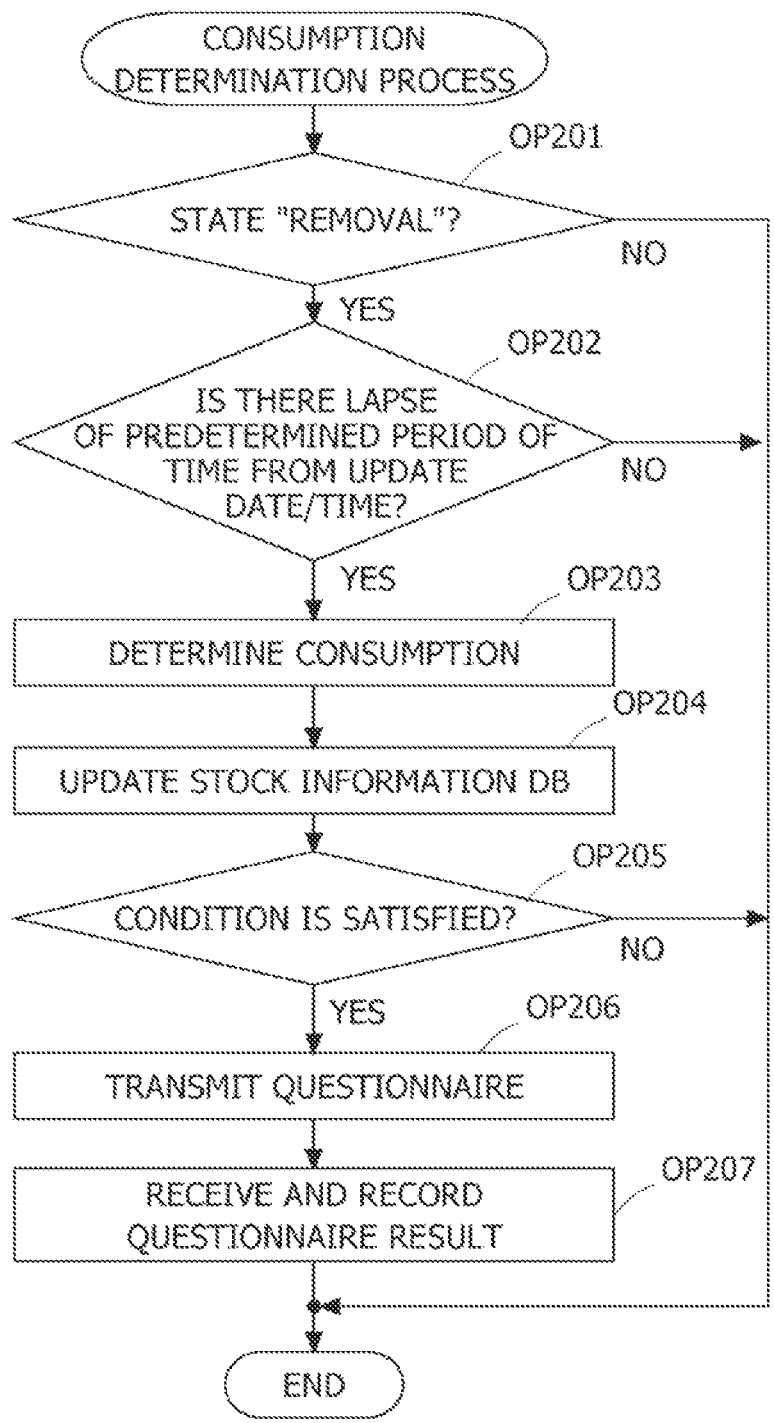
FIG. 7 is an example of a flowchart of a consumption determination process by the center server.

FIG. 7 is an example of a flowchart of a consumption determination process by the center server 1. The consumption determination process is a process of determining whether object 300 is consumed. The process illustrated in FIG. 7 is performed every predetermined period of time in units of one hour or one day, for example. Furthermore, the process illustrated in FIG. 7 is performed for each record in the stock information DB 16.

In OP201, the control unit 12 determines whether the value in the field "state" of a target record in the stock information DB 16 is information indicating removal. In the case where the value in the field "state" of the target record in the stock information DB 16 is information indicating removal (OP201: YES), the process proceeds to OP202. In the case where the value in the field "state" of the target record in the stock information DB 16 is not information indicating removal (OP201: NO), the process illustrated in FIG. 7 is ended.

In OP202, the control unit 12 determines whether there is a lapse of a predetermined period of time or more from the time indicated by the value in the field "update date/time" of the target record in the stock information DB 16. The predetermined period of time that is used in OP202 is set to a value in a range of several hours to one day, for example. Furthermore, the predetermined period of time that is used in OP202 may be changed according to the product of the target record in the stock information DB 16. In this case, the predetermined period of time that is used in OP202 may be stored in the product information DB 17.

In the case where there is a lapse of the predetermined period of time or more from the time indicated by the value in the field "update date/time" of the target record in the stock information DB 16 (OP202: YES), the process proceeds to OP203. In the case where there is not a lapse of the predetermined period of time or more from the time indicated by the value in the field "update date/time" of the target record in the stock information DB 16 (OP202: NO), the process illustrated in FIG. 7 is ended.

In OP203, the control unit 12 determines that the object 300 of the target record in the stock information DB 16 is consumed. In OP204, the control unit 12 updates the field "state" of the target record by information indicating consumption.

In OP205, the control unit 12 determines whether a condition is satisfied. For example, the condition that is used in OP205 is that the number of pieces consumed by the user, in the stock information DB 16, related to the product corresponding to the target record in the stock information DB 16 is a predetermined number or more, or that the number of times of storage/removal, by the user, of the product corresponding to the target record in the stock information DB 16 is a predetermined number of times or more. In the case where the condition is satisfied (OP205: YES), the process proceeds to OP206. In the case where the condition is not satisfied (OP205: NO), the process illustrated in FIG. 7 is ended.

In OP206, the control unit 12 transmits a questionnaire to the sensor device 2. Contents of the questionnaire relate to evaluation of the product corresponding to the object 300, for example. More specifically, for example, five options corresponding to levels of liking the product corresponding to the object 300 are included, the options being "very bad", "bad", "OK", "good" and "very good". Furthermore, the questionnaire may include a plurality of questions. The questionnaire transmitted to the sensor device 2 is displayed on the touch panel display 205 of the sensor device 2, and the user inputs the answer to the questionnaire, to the touch panel display 205. When the answer to the questionnaire is input on the touch panel display 205 by the user, the sensor device 2 transmits the same to the center server 1.

In OP207, the control unit 12 receives the answer to the questionnaire from the sensor device 2, and records the answer to the questionnaire in the questionnaire DB 18. The process illustrated in FIG. 7 is then ended.

Figure 8A:
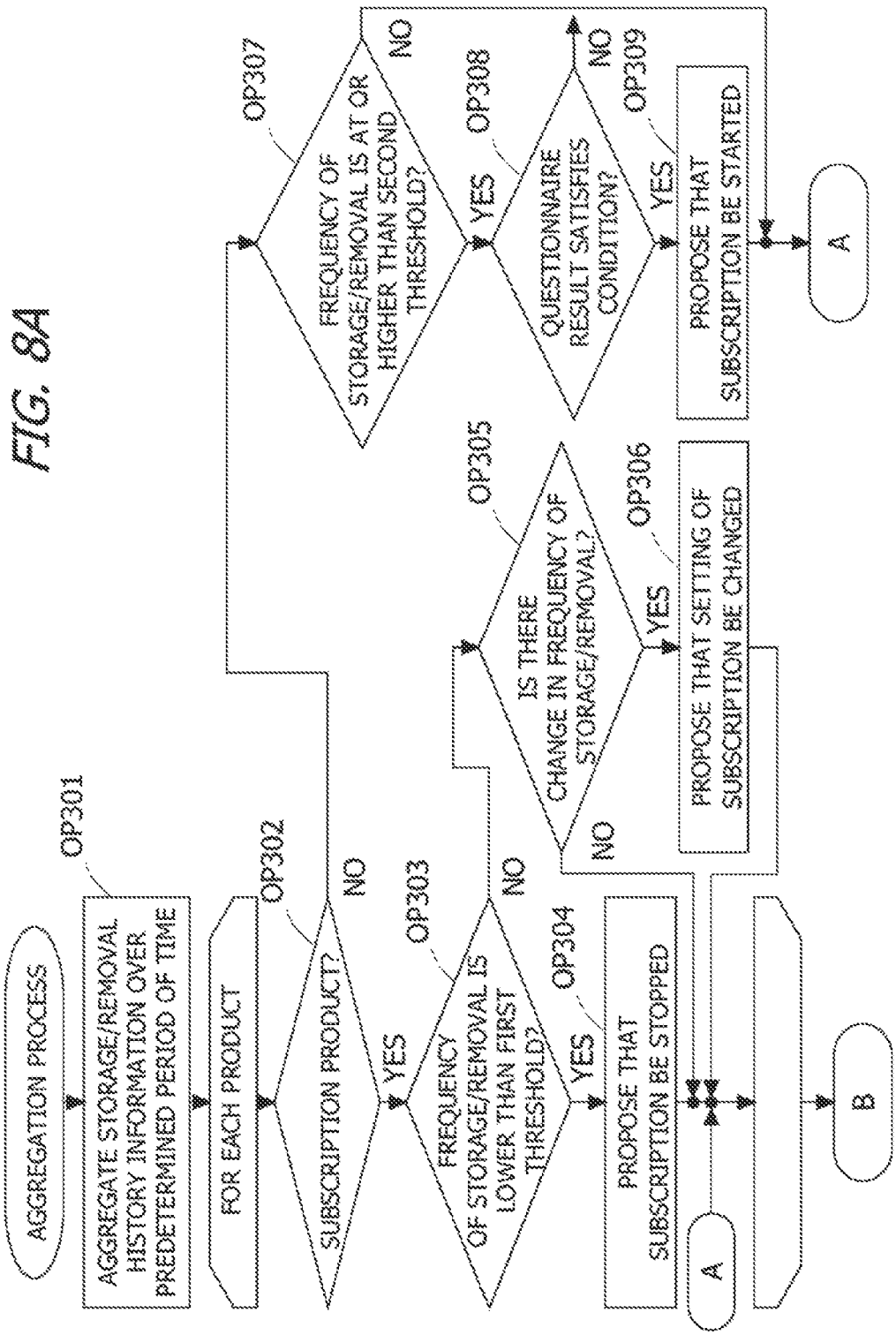
FIG. 8A is each an example of a flowchart of an aggregation process for the storage/removal history information, performed by the center server.
Figure 8B:
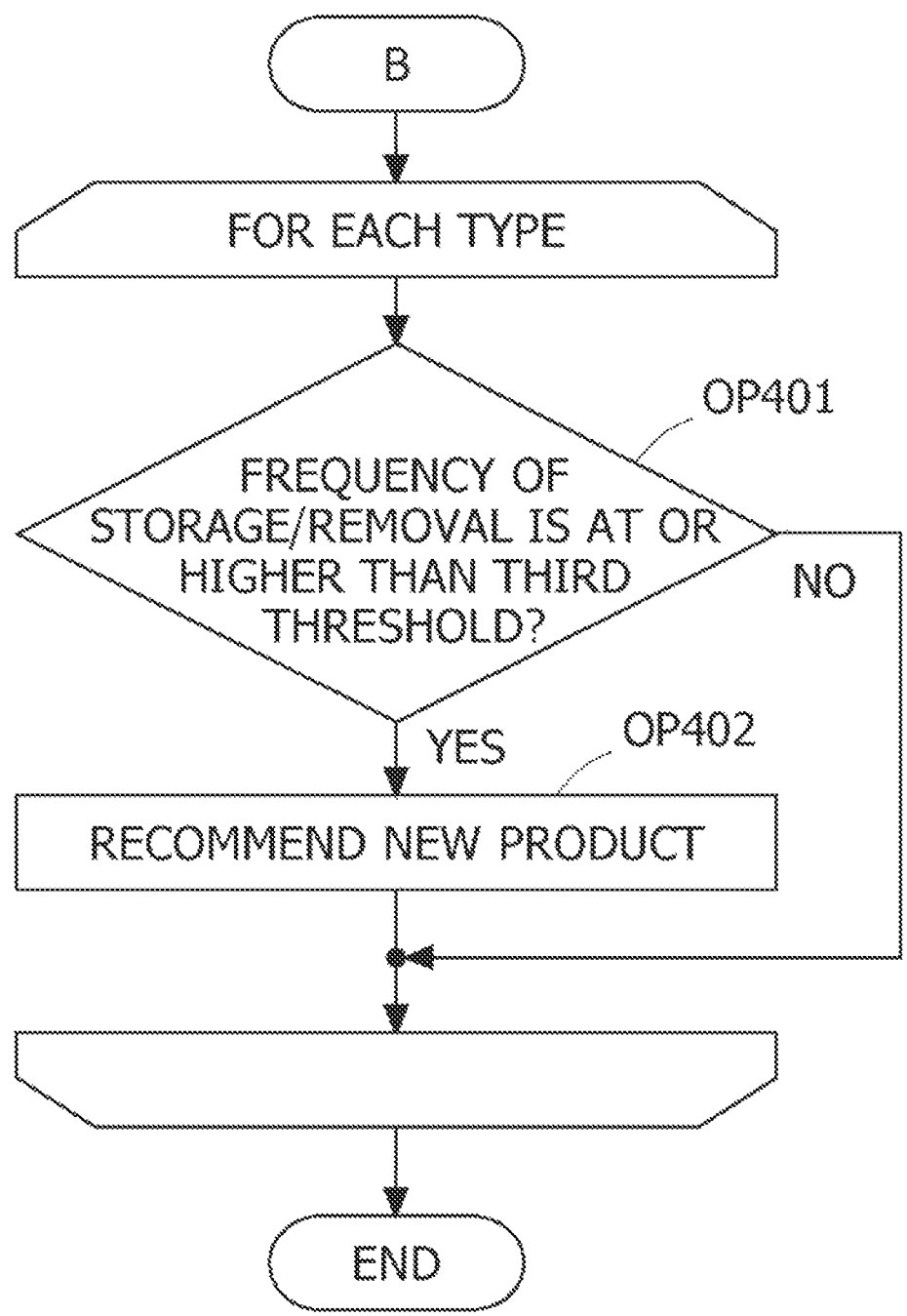
FIG. 8B is each an example of a flowchart of an aggregation process for the storage/removal history information, performed by the center server.

FIGS. 8A and 8B are each an example of a flowchart of an aggregation process for the storage/removal history information, performed by the center server 1. The processes illustrated in FIGS. 8A and 8B are performed at an interval set in units of one day, one week, one month or the like, for example. Furthermore, the processes illustrated in FIGS. 8A and 8B are performed for one sensor device 2.

In OP301, the control unit 12 aggregates storage/removal history information including the identification information on a target sensor device 2 in a predetermined period of time, for each product and for each type of product, for example. The period of time for which aggregation is performed is an immediately preceding period of time that is set in units of one day, one week, one month or the like, for example. The type of product is, in the case of an alcoholic beverage, each of articles including beer, low-malt beer, sake, fruit wine, whiskey, brandy, and liqueur, for example. However, granularity of categories related to the type of product is not limited thereto and may be arbitrarily determined, and is set in advance.

Processes from OP302 to OP309 are performed for an aggregate result for each product in OP301. In OP302, the control unit 12 determines whether a target product is a product for which subscription is set. The identification information on a product for which subscription is set by the user is held by the user information DB 14, for example. In the case where the target product is a product for which subscription is set (OP302: YES), the process proceeds to OP303. In the case where the target product is a product for which subscription is not set (OP302: NO), the process proceeds to OP307.

In OP303, the control unit 12 determines whether the frequency of storage/removal of the target product is lower than a first threshold. The frequency of storage/removal of the target product is determined as the number of times of storage/removal in a time unit of one hour that is calculated by dividing the number of storage/removal history information pieces (the number of times of storage/removal) of the target product in a predetermined period of time by the number of predetermined time units included in the predetermined period of time, for example. The time unit is set in a range of one hour to one day, for example. The frequency of storage/removal of the target product can be said to be a numerical value reflecting the consumption frequency of the target product. Furthermore, the first threshold is different depending on the target product, and the control unit 12 acquires the first threshold for the target product from the product information DB 17.

In the case where the frequency of storage/removal of the target product is lower than the first threshold (OP303: YES), the process proceeds to OP304. In OP304, because the frequency of storage/removal of the target product for which subscription is set is lower than the first threshold, the control unit 12 determines to propose that subscription to the target product be stopped, and transmits the proposal to the sensor device 2. For example, in the case of the object 300 that is stored in the refrigerator 200 and that is not consumed for a relatively long time, the number of storage/removal history information pieces in the predetermined period of time is small, and the consumption pattern for the product corresponding to the object 300 indicates low consumption frequency and non-match to the taste of the user. In this case, the frequency of storage/removal of the product corresponding to the object 300 is lower than the first threshold, and in the case where subscription to the product is set, a proposal is made to stop subscription.

In the case where the frequency of storage/removal of the target product is at or higher than the first threshold (OP303: NO), the process proceeds to OP305. In OP305, the control unit 12 determines whether there is a change amounting to ±α or more in the frequency of storage/removal of the target product. For example, the frequency of storage/removal of each product is saved, as a history, in a predetermined storage area in the external storage device 103, and the control unit 12 compares an average value of a predetermined number of immediately preceding frequencies of storage/removal of the target product and the currently acquired frequency of storage/removal of the target product. Furthermore, the value a indicating a range of change in the frequency of storage/removal is different for each product, and the value a for the target product is acquired from the product information DB 17, for example.

In the case where the frequency of storage/removal of the target product is changed by ±α or more (OP305: YES), the process proceeds to OP306. In OP306, the control unit 12 determines to propose that setting of subscription to the target product be changed, and transmits the proposal to the sensor device 2. A change of setting of subscription to the target product may be a change of a delivery interval and/or a change of an order quantity per delivery, for example.

In the case where the frequency of storage/removal of the target product is not changed by ±α or more (OP305: NO), the process proceeds to OP302 for the next product, or in the case where the processes from OP302 to OP309 are already performed for all the products, the process proceeds to OP401 in FIG. 8B.

The processes from OP307 to OP309 are processes for a case where the target product is a product for which subscription is not set. In OP307, the control unit 12 determines whether the frequency of storage/removal of the target product is at or higher than a second threshold. The second threshold is different for each target product, and thus, the control unit 12 acquires the second threshold for the target product from the product information DB 17. For example, the second threshold takes a value that is equal to or greater than the first threshold.

In the case where the frequency of storage/removal of the target product is at or higher than the second threshold (OP307: YES), the process proceeds to OP308. In the case where the frequency of storage/removal of the target product is lower than the second threshold (OP307: NO), the process proceeds to OP302 for the next product, or in the case where the processes from OP302 to OP309 are already performed for all the products, the process proceeds to OP401 in FIG. 8B.

In OP308, the control unit 12 determines whether a questionnaire result from the user satisfies a condition, by referring to the questionnaire DB 18. The condition in OP308 is that the questionnaire result indicating evaluation of the target product by the user is "very good" or "good". However, the condition in OP308 is not limited thereto, and is set according to contents of the questionnaire or the answer to the questionnaire, for example.

In the case where the questionnaire result from the user satisfies the condition (OP308: YES), the process proceeds to OP309. In the case where the questionnaire result from the user does not satisfy the condition (OP308: NO), the process proceeds to OP302 for the next product, or in the case where the processes from OP302 to OP309 are already performed for all the products, the process proceeds to OP401 in FIG. 8B.

In OP309, the control unit 12 determines to propose that subscription to the target product be started, and transmits the proposal to the sensor device 2. Then, the process proceeds to OP302 for the next product, or in the case where the processes from OP302 to OP309 are already performed for all the products, the process proceeds to OP401 in FIG. 8B.

The process illustrated in FIG. 8B is a process that is performed on an aggregate result for each type of product. In OP401, the control unit 12 determines whether the frequency of storage/removal of the type of a target product is at or higher than a third threshold. The third threshold is different for each type of target product, and thus, the control unit 12 acquires the third threshold for the type of the target product from the product information DB 17.

In the case where the frequency of storage/removal of the type of the target product is at or higher than the third threshold (OP401: YES), the process proceeds to OP402. In the case where the frequency of storage/removal of the type of the target product is lower than the third threshold (OP401: NO), the process proceeds to OP401 for the next type of product, or in the case where the processes of OP401 and OP402 are already performed for all types of products, the process in FIG. 8B is ended.

In OP402, the sensor device 2 determines to recommend a new product of the type of the target product, and transmits the recommendation to the sensor device 2. Then, the process proceeds to OP401 for the next type of product, or in the case where the processes of OP401 and OP402 are already performed for all types of products, the process in FIG. 8B is ended.

Additionally, the processes illustrated in FIGS. 6 to 8B may be changed as appropriate according to the embodiment. For example, the condition used in OP205 in FIG. 7 to determine transmission of a questionnaire may be that the number of times of storage/removal of the corresponding product is at or greater than a predetermined value. Furthermore, in FIG. 8A, in the case of determining whether to propose that subscription be stopped or that the setting be changed, the control unit 12 may further refer to the answer of the user to the questionnaire. For example, in the case where the answer to the questionnaire indicates a high evaluation of a predetermined product, stopping of subscription does not have to be proposed even if the number of times of storage/removal of the predetermined product is smaller than the first threshold.

<Operations and Effects of First Embodiment>

In the first embodiment, the sensor device 2 provided at the refrigerator 200 acquires the history information about storage of the object 300 in the refrigerator 200 or removal of the object 300 from the refrigerator 200, and information indicating a consumption pattern, of the user, for the product corresponding to the object 300 is acquired based on the storage/removal history information on the object 300. Therefore, according to the first embodiment, information indicating the consumption pattern of the user for a product may be acquired efficiently and without troubling the user.

Furthermore, in the first embodiment, start of subscription to a product, change of setting, or stop of subscription is proposed based on the information indicating the consumption pattern of the user for the product. Accordingly, a proposal regarding subscription may be made in better accordance with an actual state of consumption of the product by the user, and stock management of a product may be facilitated also for the user.

Furthermore, in the first embodiment, a questionnaire is transmitted to the user in relation to a product consumption of which is detected. An evaluation of a product by the user who actually consumed the product may be easily acquired.

Furthermore, in the first embodiment, the threshold used for determination, based on the storage/removal history information on a product, as to whether to propose start of subscription, change of setting, or stop of subscription is prepared for each product and each type of product. The pattern of consumption frequency, a relationship between consumption and storage/removal, a period of time until an expiry date, and the like are different for each product. Accordingly, by preparing the threshold for each product and for each type of product, determination may be made in better accordance with the property of the product, and a more helpful proposal may be made to the user.

Second Embodiment

In the first embodiment, a proposal regarding subscription, a recommendation for a product, a questionnaire, and the like from the center server 1 are transmitted to the sensor device 2, and are output to the touch panel display 205 of the sensor device 2. In a second embodiment, instead, the proposal regarding subscription, the recommendation for a product, the questionnaire, and the like from the center server 1 are transmitted to a delivery robot for delivering a product for which subscription is set, and are output to a display or the like of the delivery robot at the time of handing over of the product.

Figure 9:
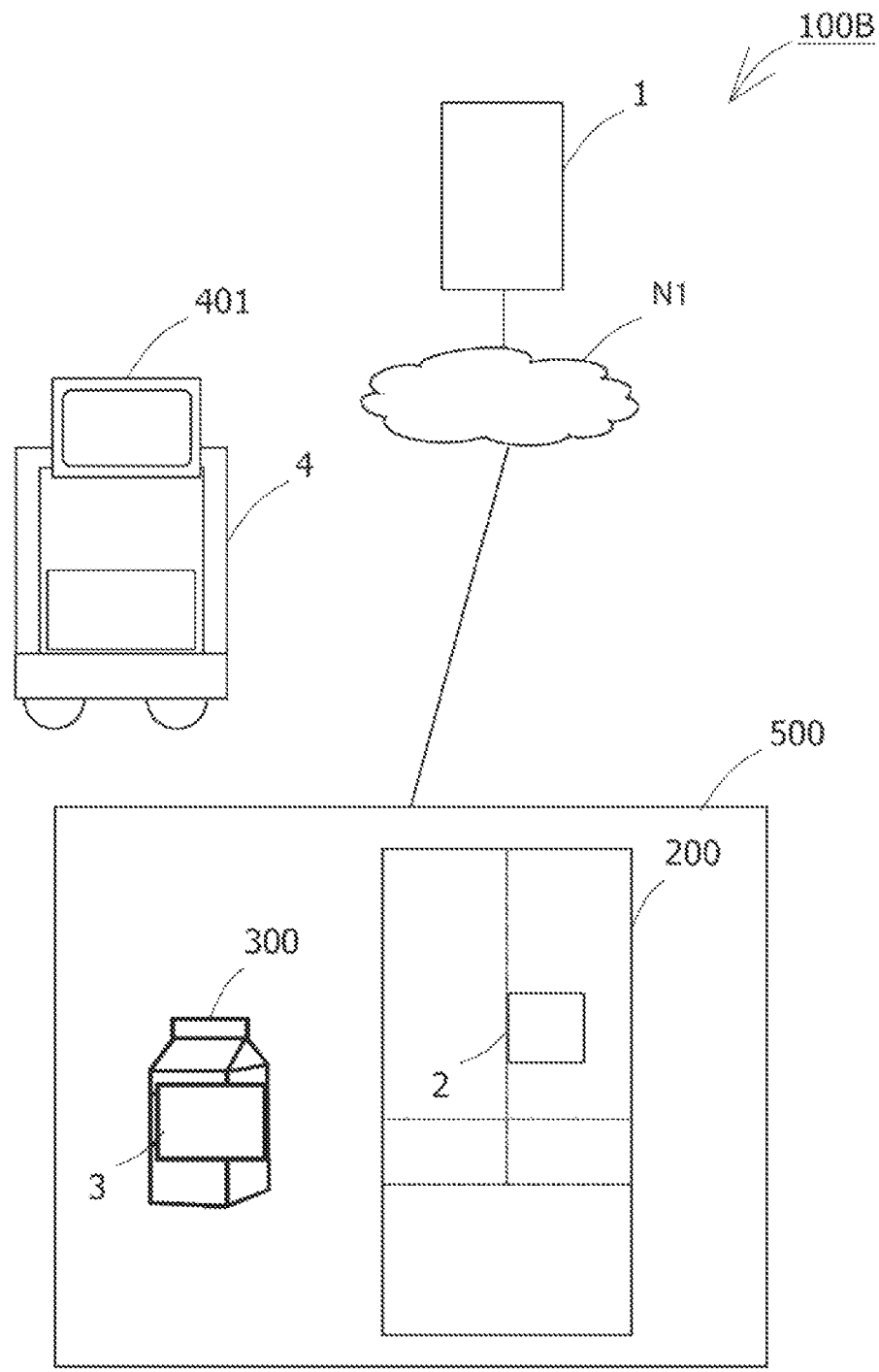
FIG. 9 is a diagram illustrating an example of a system configuration of a storage/removal management system according to the second embodiment.

FIG. 9 is a diagram illustrating an example of a system configuration of a storage/removal management system 100B according to the second embodiment. The storage/removal management system 100B includes a delivery robot 4, in addition to the components of the storage/removal management system 100 according to the first embodiment. The delivery robot 4 is a robot that performs delivery by carrying a product and traveling to a predetermined delivery destination. The delivery robot 4 includes a wireless communication function, and is capable of communicating with the center server 1 over the network N1. Furthermore, the delivery robot 4 includes a touch panel display 401, and outputs a proposal regarding subscription, a recommendation for a product, a questionnaire, and the like that are received from the center server 1.

In the second embodiment, as in the first embodiment, the center server 1 performs the processes from FIG. 6 to FIG. 8B, and determines, based on the storage/removal history information on the object 300, whether to make a proposal regarding subscription, recommend a product, and give a questionnaire, for example. Then, if, at the time of delivery of a product for which subscription is set, there is a proposal regarding subscription, a recommendation for a product, a questionnaire or the like in relation to the product, the control unit 12 of the center server 1 instructs the delivery robot 4 to output the same.

Figure 10:
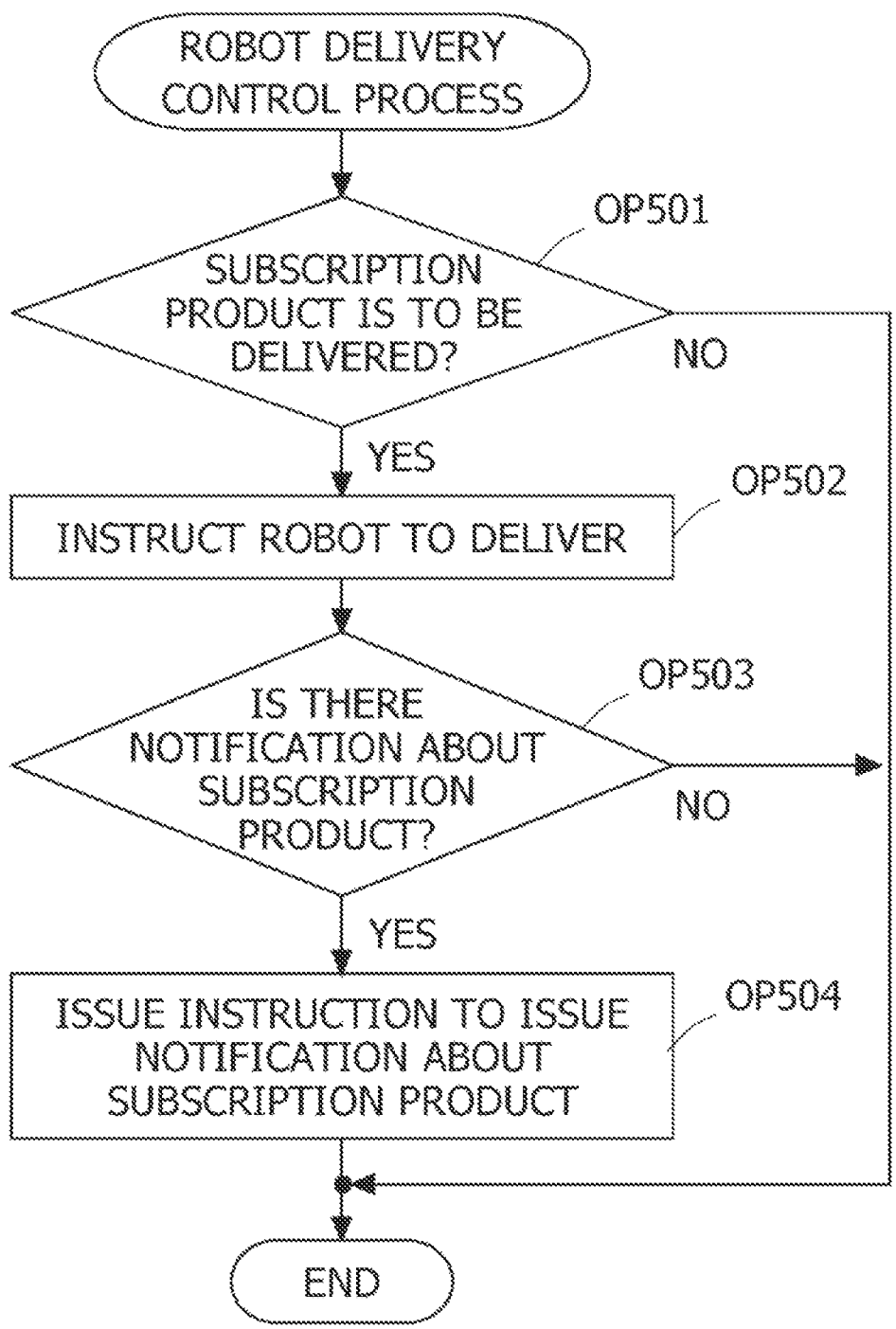
FIG. 10 is an example of a flowchart of a robot delivery control process by the center server according to the second embodiment.

FIG. 10 is an example of a flowchart of a robot delivery control process by the center server 1 according to the second embodiment. The process illustrated in FIG. 10 is performed every predetermined period of time. The process illustrated in FIG. 10 is performed for each user, for example.

In OP501, the control unit 12 determines whether a delivery timing for a product for which subscription is set is reached. Information about subscription is held in the user information DB 14. In the case where the delivery timing for a product for which subscription is set is reached (OP501: YES), the process proceeds to OP502. In the case where the delivery timing for a product for which subscription is set is not reached (OP501: NO), the process illustrated in FIG. 10 is ended.

In OP502, the control unit 12 transmits a delivery instruction to the delivery robot 4. In OP503, the control unit 12 determines whether there is a notification regarding a proposal about subscription, a recommendation for a product, a questionnaire, or the like in relation to the product to which the user is subscribed. With respect to this determination, for example, in the case where a notification regarding a proposal about subscription, a recommendation for a product, a questionnaire, or the like is determined by the processes in FIGS. 8A and 8B, the control unit 12 records such a determination in a predetermined storage area in the memory 102, and performs the above-mentioned determination based on whether a determination result regarding the notification is recorded.

In the case where there is a notification regarding a proposal about subscription, a recommendation for a product, a questionnaire, or the like in relation to the product to which the user is subscribed (OP503: YES), the process proceeds to OP504. In the case where there is no notification regarding a proposal about subscription, a recommendation for a product, a questionnaire, or the like in relation to the product to which the user is subscribed (OP503: NO), the process illustrated in FIG. 10 is ended.

In OP504, the control unit 12 instructs the delivery robot 4 to notify of the proposal about subscription, the recommendation for a product, the questionnaire, or the like in relation to the product to which the user is subscribed. The process illustrated in FIG. 10 is then ended. The delivery robot 4 outputs the notification to the touch panel display 401 according to the instruction, at the time of handing over of the product to which subscription is set.

In the second embodiment, at the time of handing over of a product for which subscription is set, the user is notified of a proposal about subscription, a recommendation for a product, a questionnaire, or the like in relation to the product to which the user is subscribed, and thus, such a notification may be issued at a timing when the user is thinking about the product. An effect of proposal or the like, or a collection rate regarding an answer to a questionnaire may thus be increased.

Third Embodiment

In a third embodiment, an RFID is used as a sensor for detecting the object 300 that is stored in the refrigerator 200. That is, in the third embodiment, the reader 206 provided on the sensor device 2 is a reader for RF tags, and an RF tag 3 is attached to or embedded in the object 300 instead of the code 3. The third embodiment is the same as the first and second embodiments except that the RFID is used. A description overlapping those of the first and second embodiments will be omitted.

In the third embodiment, the reader 206 is a reader for RF tags. For example, the reader 206 emits a radio wave for short-range wireless communication every predetermined period of time, and receives a reflected wave from the RF tag 3. The reflected wave from the RF tag 3 includes identification information recorded in the RF tag 3. When the identification information included in the reflected wave from the RF tag 3 is acquired, the reader 206 outputs the same to the CPU 201. An interval of emission from the reader 206 may be arbitrarily set in units of one second, in a range of one second to 10 minutes, for example.

That is, the reader 206 receives identification information on the object 300 that is stored in the refrigerator 200, from the RF tag 3 stored in the refrigerator 200. In the case where a plurality of objects 300 are stored in the refrigerator 200, and the reader 206 is to receive the reflected wave from the RF tag 3 in relation to one, some or all of the objects 300, the identification information is acquired for the one, some or all of the objects 300.

In the third embodiment, the control unit 22 of the sensor device 2 receives, from the reader 206, input of the identification information on one or a plurality of objects 300 read from the RF tag(s) 3. When input of the identification information on one or a plurality of objects 300 is received from the reader 206, the control unit 22 creates detected stock information, outputs the information to the transmission unit 23, and transmits the information to the center server 1 through the transmission unit 23. For example, the detected stock information includes a timestamp, the identification information on the sensor device 2, and the identification information on the one or plurality of objects 300 detected.

In the third embodiment, when the detected stock information is received from the sensor device 2, the control unit 12 of the center server 1 stores the same in a predetermined storage area in the memory 102. Furthermore, the control unit 12 compares the previously received detected stock information and the currently received detected stock information, and records the difference, as the storage/removal history information, in the storage/removal history information DB 15 and the stock information DB 16.

FIG. 11 is an example of a flowchart of a process, according to the third embodiment, that is performed by the center server 1 at the time of reception of the detected stock information. In the third embodiment, the process illustrated in FIG. 11 is performed instead of the process according to the first embodiment that is illustrated in FIG. 6. The process illustrated in FIG. 11 is performed every predetermined period of time.

In OP601, the control unit 12 determines whether the detected stock information is received from the sensor device 2 through the reception unit 11. In the case where the detected stock information is received from the sensor device 2 (OP601: YES), the process proceeds to OP602. In the case where the detected stock information is not received from the sensor device 2 (OP601: NO), the process illustrated in FIG. 11 is ended.

In OP602, the control unit 12 compares the currently received detected stock information against the previously received detected stock information, and determines whether there is a difference from the previously received detected stock information. In the case where there is a difference from the previously received detected stock information (OP602: YES), it is indicated that the object 300 is stored in or removed from the refrigerator 200, and the process proceeds to OP603. In the case where there is no difference from the previously received detected stock information (OP602: NO), it is indicated that the object 300 is not stored in or removed from the refrigerator 200, and the process illustrated in FIG. 11 is ended.

In OP603, the control unit 12 determines an object 300 that is newly detected from the currently received detected stock information as an object that is stored, and determines an object 300 that is included in the previously received detected stock information but is no longer detected from the currently received detected stock information as an object that is removed.

In OP604, the control unit 12 records the object 300 for which storage or removal is determined in OP603, in the storage/removal history information DB 15 and the stock information DB 16. As the timestamp, in the storage/removal history information DB 15 and the stock information DB 16, of the object 300 for which storage/removal is determined, the timestamp included in the currently received detected stock information is used. Furthermore, the currently received detected stock information is saved in a predetermined storage area in the memory 102. At this time, the previously received detected stock information may be updated by the currently received detected stock information, or both detected stock information pieces may be kept.

Subsequent processes are performed in the same manner as in FIGS. 7 to 8B in the first embodiment. Additionally, in the third embodiment, the storage/removal history information DB 15 illustrated in FIG. 4, the stock information DB 16 illustrated in FIG. 5, and the processes illustrated in FIGS. 7 to 8B and FIG. 11 are merely examples, and may be changed as appropriate according to the embodiment.

For example, instead of the process illustrated in FIG. 11, the sensor device 2 may acquire the difference between the currently received detected stock information and the previously received detected stock information as the storage/removal history information, and transmit the storage/removal history information to the center server 1. In this case, the center server 1 may perform the same process as the process illustrated in FIG. 6.

According to the third embodiment, even in a case where an RFID is used, the history information about storage of an object in the refrigerator 200 and removal of the object from the refrigerator 200 may be acquired.

Other Embodiments

The embodiment described above is an example, and the present disclosure may be changed and carried out as appropriate without departing from the gist of the present disclosure.

A plurality of users may be registered in relation to one refrigerator 200. In this case, a facial image of each user is registered in advance in the user information DB 14 as one user information piece. At the time of storage or removal of the object 300, a facial image of the user is captured by the camera 207, and the captured image is transmitted to the center server 1 to be compared with the facial image registered in the user information DB 14 so that the user is identified. The identification information on a user is added to the storage/removal history information, and the storage/removal history information for each product is aggregated for each user. Then, the processes of FIGS. 6 to 8B are performed for each user. A proposal regarding subscription, a recommendation for a product, a questionnaire, and the like may be given based on the consumption pattern of each user for a product. In this case, the facial image of a user captured by the camera 207 is an example of "identification information on a user".

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A device comprising:
    a reception unit configured to receive over a network, from a sensor provided in a repository, history information including storage and removal of a first object in the repository detected by the sensor, wherein a camera that detects a user storing or removing the first object is provided at the repository, and the camera captures a facial image of the user storing or removing the first object;
    a second storage that stores an association between the repository and the facial image as identification information on a plurality of users; and
    a processor configured to:
    determine whether the history information is received by the reception unit from the sensor;
    compare the captured facial image by the camera with the facial image registered in the second storage to identify the user,
    acquire, together with the history information, the identification information on the user identified by the camera;
    acquire first information indicating a use pattern, for the first object, for each of the plurality of users, wherein the first information is based on the history information;
    determine whether the first information satisfies a first condition;
    based upon the first information satisfying the first condition, transmit a request to the sensor over the network, for levels of liking the first object to be input by the user on the sensor;
    receive a response to the request over the network, including a level of liking the first object selected by the user from among the levels;
    determine whether the level of liking in the response to the request satisfies a second condition; and
    based upon the first information satisfying the first condition and based upon the level of liking satisfying the second condition, perform a process related to acquisition of the first object to the user, including determining to send the first object and outputting a notification of sending the first object to the user,
    wherein the processor further transmits an instruction to a robot that controls the robot to carry the first object and controls the robot to output a proposal to the user when carrying the first object to the user based upon the first information satisfying the first condition and based upon the level of liking satisfying the second condition.

2. The device according to claim 1, wherein, in a case where periodical acquisition of the first object to the user is set, and the first information indicates that use frequency of the first object is lower than a first threshold, the processor proposes, in the process related to acquisition, that the user cancels the periodical acquisition of the first object.

3. The device according to claim 2, further comprising a storage that stores the first threshold for each object, wherein the processor further acquires the first threshold for the first object from the storage.

4. The device according to claim 1, wherein, in a case where periodical acquisition of the first object is set, and the first information indicates that an amount of change in use frequency of the first object is a predetermined amount or more, the processor proposes, in the process related to acquisition, that the user change setting of at least one of an acquisition interval and a quantity per acquisition in relation to the periodical acquisition of the first object.

5. The device according to claim 1, wherein, in a case where periodical acquisition of the first object is not set, and the first information indicates that use frequency of the first object is at or higher than a second threshold, the processor proposes, in the process related to acquisition, periodical acquisition of the first object to the user.

6. The device according to claim 1, wherein the processor further transmits, to the user, a recommendation for another object of a type into which the first object is categorized, in a case where the first information indicates that use frequency of the first object or an object of the type into which the first object is categorized is at or higher than a third threshold.

7. An information processing system comprising:
    a repository comprising:
    a sensor that detects storage and removal of a first object in the repository;
    a camera that detects a user storing or removing the first object and captures a facial image of the user storing or removing the first object;
    a wireless communication unit configured to transmit, over a network, history information including the storage and removal of the first object in the repository detected by the sensor;

a storage that stores an association between the repository and the facial image as identification information on a plurality of users; and a center service comprising:

a reception unit configured to receive over the network, the history information from the repository; and a processor configured to:

compare the captured facial image by the camera with the facial image registered in the storage to identify the user, acquire, together with the history information, the identification information on the user identified by the camera;

acquire first information indicating a use pattern, for the first object, for each of the plurality of users, wherein the first information is based on the history information;

determine whether the history information is received by the reception unit from the repository;

determine whether the first information satisfies a first condition;

based upon the first information satisfying the first condition, transmit a request, to the sensor over the network, for levels of liking the first object to be input by the user on the sensor;

receive a response to the request over the network, including a level of liking the first object selected by the user from among the levels;

determine whether the level of liking in the response to the request satisfies a second condition; and based upon the first information satisfying the first condition and based upon the level of liking satisfying the second condition, perform a process related to acquisition of the first object to the user including determining to send the first object and outputting a notification of sending the first object to the user, wherein the processor further transmits an instruction to a robot that controls the robot to carry the first object and controls the robot to output a proposal to the user when carrying the first object to the user based upon the first information satisfying the first condition and based upon the level of liking satisfying the second condition.

8. The information processing system according to claim 7, wherein, in a case where periodical acquisition of the first object is set, and the first information indicates that use frequency of the first object is lower than a first threshold, the processor proposes, in the process related to acquisition, that the user cancels the periodical acquisition of the first object.

9. The information processing system according to claim 8, further comprising a storage that stores the first threshold for each object, wherein the processor further acquires the first threshold for the first object from the storage.

10. The information processing system according to claim 7, wherein, in a case where periodical acquisition of the first object is set, and the first information indicates that an amount of change in use frequency of the first object is a predetermined amount or more, the processor proposes, in the process related to acquisition, that the user change setting of at least one of an acquisition interval and a quantity per acquisition in relation to the periodical acquisition of the first object.

11. The information processing system according to claim 7, wherein, in a case where periodical acquisition of the first object is not set, and the first information indicates that use frequency of the first object is at or higher than a second threshold, the processor proposes, in the process related to acquisition, periodical acquisition of the first object to the user.

12. The information processing system according to claim 7, wherein the processor further transmits, to the user, a recommendation for another object of a type into which the first object is categorized, in a case where the first information indicates that use frequency of the first object or an object of the type into which the first object is categorized is at or higher than a third threshold.

13. A method, performed by a computer, the method comprising:

detecting, using a sensor in a repository, history information including storage and removal of a first object in the repository;

detecting, using a camera in the repository, a user storing or removing the first object is provided at the repository, wherein the camera captures a facial image of the user storing or removing the first object;

storing, in a storage, an association between the repository and the facial image as identification information on a plurality of users;

transmitting over a network, the history information from the repository to a center server;

comparing the captured facial image by the camera with the facial image registered in the storage to identify the user, acquiring, together with the history information, the identification information on the user identified by the camera;

acquiring first information indicating a use pattern, for the first object, for each of the plurality of users, wherein the first information is based on the history information;

determining whether the first information satisfies a first condition;

based upon the first information satisfying the first condition, transmitting a request to the sensor over the network, for levels of liking the first object to be input by the user on the sensor;

receiving a response to the request over the network, including a level of liking the first object selected by the user from among the levels;

determining whether the level of liking in the response to the request satisfies a second condition;

based upon the first information satisfying the first condition and based upon the level of liking satisfying the second condition, performing a process related to acquisition of the first object to the user including determining to send the first object and outputting a notification of sending the first object to the user; and transmitting an instruction to a robot that controls the robot to carry the first object and controls the robot to output a proposal to the user when carrying the first object to the user based upon the first information satisfying the first condition and based upon the level of liking satisfying the second condition.

* * * * *